(12) United States Patent
Moran et al.

(10) Patent No.: US 10,324,516 B2
(45) Date of Patent: Jun. 18, 2019

(54) DETECTING UNDESIRED ENERGY CONSUMPTION IN ELECTRONIC DEVICES

(71) Applicant: ARM IP Limited, Cambridge (GB)

(72) Inventors: Brendan James Moran, Histon (GB); James Crosby, Ely (GB); Milosch Meriac, Cambridge (GB)

(73) Assignee: ARM IP Limited, Cambridge (GB)

( * ) Notice: Subject to any disclaimer, the term of this patent is extended or adjusted under 35 U.S.C. 154(b) by 140 days.

(21) Appl. No.: 15/292,333

(22) Filed: Oct. 13, 2016

(65) Prior Publication Data

US 2017/0108913 A1  Apr. 20, 2017

(30) Foreign Application Priority Data

Oct. 15, 2015 (GB) .................................. 1518279.3

(51) Int. Cl.
*G06F 1/32* (2019.01)
*G06F 1/3234* (2019.01)
*G06F 1/3206* (2019.01)
*G06F 9/445* (2018.01)

(52) U.S. Cl.
CPC .......... *G06F 1/3234* (2013.01); *G06F 1/3206* (2013.01); *G06F 9/44505* (2013.01); *Y02D 10/43* (2018.01)

(58) Field of Classification Search
CPC .............................. G06F 1/3234; G06F 1/3206
See application file for complete search history.

(56) References Cited

U.S. PATENT DOCUMENTS

| | | | |
|---|---|---|---|
| 6,564,328 B1 | 5/2003 | Grochowski et al. | |
| 2004/0268166 A1 | 12/2004 | Farkas et al. | |
| 2005/0289366 A1 | 12/2005 | Reilly | |
| 2007/0143640 A1* | 6/2007 | Simeral | G06F 1/28 713/320 |
| 2007/0198864 A1 | 8/2007 | Takase | |
| 2012/0144215 A1 | 6/2012 | Naffziger et al. | |
| 2013/0080755 A1* | 3/2013 | Lin | G06F 9/4401 713/2 |
| 2013/0138989 A1 | 5/2013 | Jang et al. | |
| 2015/0089252 A1 | 3/2015 | Chen | |

OTHER PUBLICATIONS

Search Report dated Feb. 23, 2016 for GB Application No. 1518279.3, 8 pages.

* cited by examiner

*Primary Examiner* — Stefan Stoynov
(74) *Attorney, Agent, or Firm* — Patterson Thuente Pedersen, P.A.

(57) ABSTRACT

A method for detecting and responding to a configuration setting capable of causing undesired energy consumption in a configurable electronic device comprises measuring a power state of at least one connection point of the configurable electronic device to establish a measured power state value; comparing the measured power state value with a stored power state value for the connection point; and responsive to a discrepancy between the measured power state value and the stored power state value for the connection point where the discrepancy is capable of causing undesired energy consumption, emitting a condition signal.

14 Claims, 3 Drawing Sheets

DETECTING UNDESIRED ENERGY CONSUMPTION IN ELECTRONIC DEVICES

RELATED APPLICATION

The present application claims priority to GB Application No. 1518279.3 filed Oct. 15, 2015, which is hereby incorporated herein in its entirety by reference.

TECHNICAL FIELD

The present technique relates generally to the detection and handling of configuration settings that can cause undesired energy consumption in electronic devices.

BACKGROUND ART

Misconfiguration of an electronic device, such as a microcontroller, can cause significant wasted energy. For example, if a pin, such as a general-purpose input-output (GPIO) pin, is configured with an internal pull-up or pull-down resistor, or if it is driven so that current flows through the external circuit, then this disadvantageously consumes energy resulting in undesired energy consumption. Such a misconfiguration may also, for example, cause a peripheral to remain powered on even if it is not used. Considerable energy losses can be caused by such accidental misconfigurations, and can go undetected, potentially for a device's lifetime; this is clearly undesirable.

SUMMARY OF THE INVENTION

In a first approach to detecting and handling undesired energy consumption in electronic devices, there is provided a machine-implemented method for detecting and responding to a configuration setting capable of causing undesired energy consumption in a configurable electronic device. The method comprises measuring a power state of at least one connection point of the configurable electronic device to establish a measured power state value; comparing the measured power state value with a stored power state value for the connection point; and responsive to a discrepancy between the measured power state value and the stored power state value for the connection point where the discrepancy is capable of causing undesired energy consumption, emitting a condition signal.

In a second approach, there is provided an electronic device for detecting and responding to a configuration setting capable of causing undesired energy consumption in a configurable electronic device. The device comprises a power measurement component operable to measure a power state of at least one connection point of the configurable electronic device to establish a measured power state value; a comparator operable to compare the measured power state value with a stored power state value for the connection point; and a signaling component responsive to a discrepancy between the measured power state value and the stored power state value for the connection point where the discrepancy is capable of causing undesired energy consumption to emit a condition signal.

BRIEF DESCRIPTION OF THE DRAWINGS

Implementations of the disclosed technology will now be described, by way of example only, with reference to the accompanying drawings, in which.

DETAILED DESCRIPTION

Figure 1:
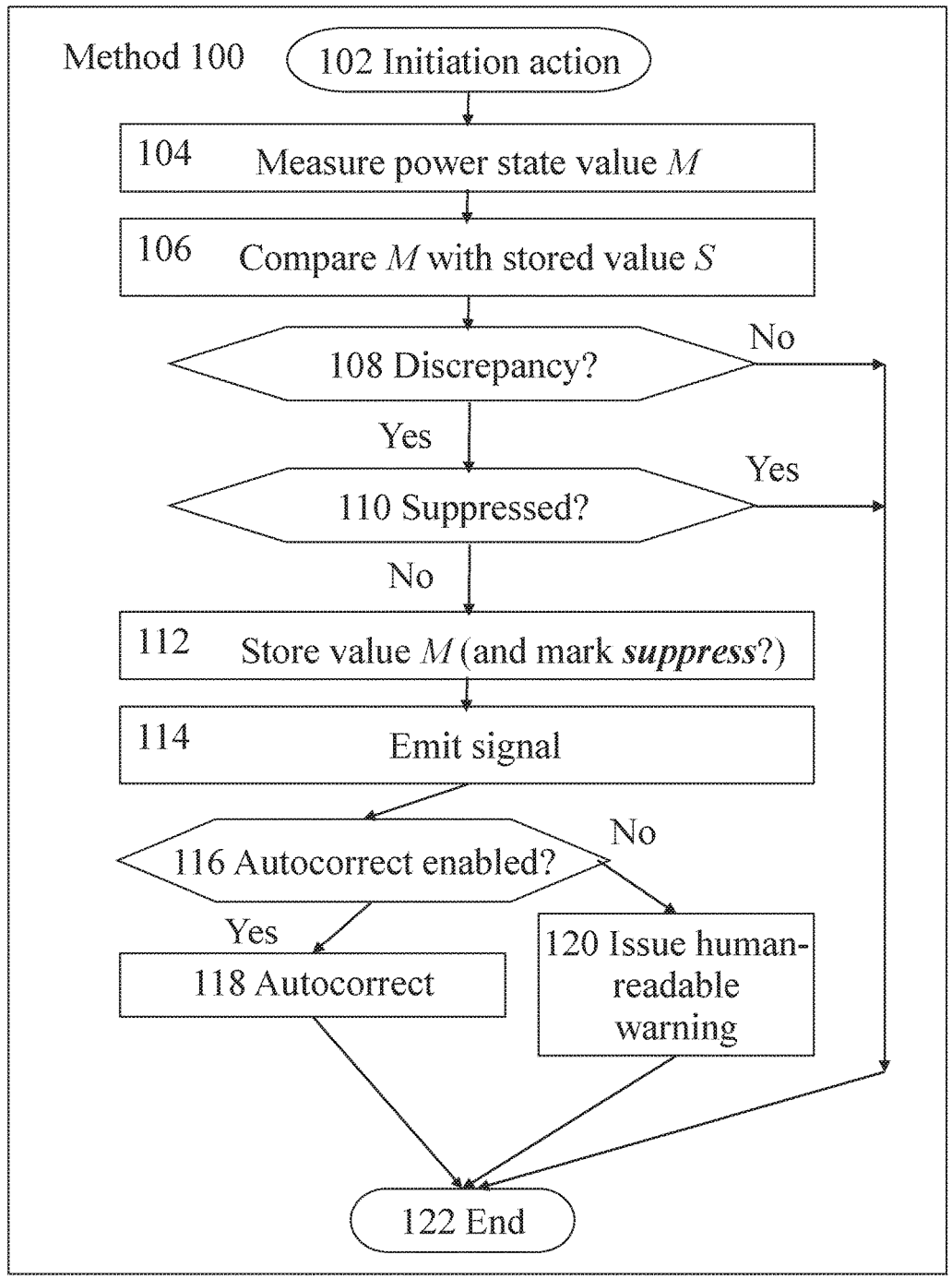
FIG. 1 shows a machine-implemented method of detecting configuration settings that can cause undesired energy consumption in electronic devices.

Turning now to FIG. 1, there is shown one example of a machine-implemented method 100 for detecting and responding to a configuration setting capable of causing undesired energy consumption in a configurable electronic device such as, but not limited to, devices having processing capabilities such as a microcontroller, application specific integrated circuit (ASIC), field programmable gate array (FPGA), integrated circuit, printed circuit board (PCB), peripheral device etc. The method is initiated at step 102, which may comprise, for example, a reset action on the configurable electronic device, an action to start entry into a low power state on the configurable electronic device, or some other state change.

At step 104, a power state is measured at a connection point (e.g. node(s), bus(es), interface pin(s) etc.) on the configurable electronic device to establish a measured power state value M. The connection point may be, for example, an input/output pin, a choke-point of a circuit, a bus or a gate. The power state may be analog or digital. At step 106, the measured power state value M is compared with a stored power state value S for the connection point. The stored power state value S may be a configuration parameter stored in a configuration file or the like on the configurable electronic device, or it may represent an expected value stored, for example, in a library.

In one additional approach, there may be a further test to compare a first stored power state value S stored in a configuration file or the like on the configurable electronic device with a second stored power state value S stored in a library. This additional approach then continues at test step 108, but substituting the first stored power state value S stored in a configuration file or the like on the configurable electronic device for the measured power state value M in the test and subsequent steps.

If, at test step 108, no discrepancy is found between measured power state value M and stored power state value S, the process ends at end step 122. If, at test step 108, a discrepancy is found between measured power state value M and stored power state value S, the process proceeds to an optional further test step 110. "Discrepancy" is used here to indicate any discrepancy or difference that may be significant in being capable of causing undesired energy consumption. Thus, for example, a discrepancy in an analog environment may be a strict inequality, or it may be a percentage of deviation from a set value, where the deviation is significant in its potential for causing undesired power consumption. In a digital environment, a discrepancy may be an opposite state or any unexpected state that may cause such undesired power consumption.

In one variant of the present technology, as mentioned above, there is a further test at test step 110, which determines whether the "out-of-line" value causing the discrepancy is already known and has been marked for suppression. If the discrepancy has been marked for suppression, no further action is taken and the process proceeds to End step 122. If the discrepancy has not been marked for suppression, at step 112, value M is stored, and in one variant, may be marked for suppression if it is detected again in future. In this way, a second or further occurrence of a discrepancy at the same connection point may be disregarded at the discretion of the system designer.

If no suppression is required, at step 114, a condition signal indicating detection of a relevant discrepancy is emitted. In one embodiment, a test is executed at test step 116 to determine whether an autocorrect function is enabled in the system. If no autocorrect function is enabled, test step 116 passes control to step 120, at which a human-readable warning is issued, and the process completes at End step 122. If an autocorrect function is enabled, test step 116 passes to autocorrect step 118, and an automated action is invoked to correct the setting that has caused the discrepancy detected at step 108. On completion of the autocorrect action at step 118, the process ends at End step 122.

Thus, provision is made in the disclosed technology for detecting and responding to a configuration setting capable of causing undesired energy consumption in a configurable electronic device. The process may be initiated by, for example, a reset action or an action to start entry into a low power state on the configurable electronic device.

For example, on booting a chip, the state and configuration of all relevant pins may be measured (high/low, and any internal weak pull resistor configuration). The reset state of the pins is high-Z, so this permits measurement of the external circuit attached to the pin. In addition to sampling the high/low state at boot time with the pin set to high-Z, a weak internal pull-up or pull-down may be set, and those states sampled. This allows the presence of external pull resistors to be distinguished from simply not-connected pins. For not-connected pins that are not subsequently configured, they can be set to ground, or not-subsequently-configured externally pulled pins can be set to input. Further, immediately before sleeping, the configuration of each pin may be examined. If a pin is configured to pull or drive in the opposite direction than was detected at reset, it is likely that power is being wasted, and so a condition signal may be issued.

Similarly, if a peripheral is not used during a period of sleep, but was left powered, a warning may be issued. In this embodiment, the technique may determine during a sleep if a peripheral is used. This may be done by checking hardware flags before/after sleep, examining IRQ status registers or maintaining dirty flags when calling certain functions. If the peripheral device was not used but was powered on during the sleep, a condition signal may be issued. This could, for example, result in disabling RX (receive) for a UART Universal Asynchronous Receiver/Transmitter) peripheral if only TX (transmit) is ever used—in this case, just parts of a peripheral may be disabled when not used.

Measuring the power state of the connection may involve inducing a power state change at the connection point and sampling ensuing responsive state data, and/or may involve temporarily changing a characteristic of the connection point and sampling ensuing responsive state data. The process may be performed by a built-in component, or it may be performed by a further electronic device temporarily connected to the connection point.

Figure 2:
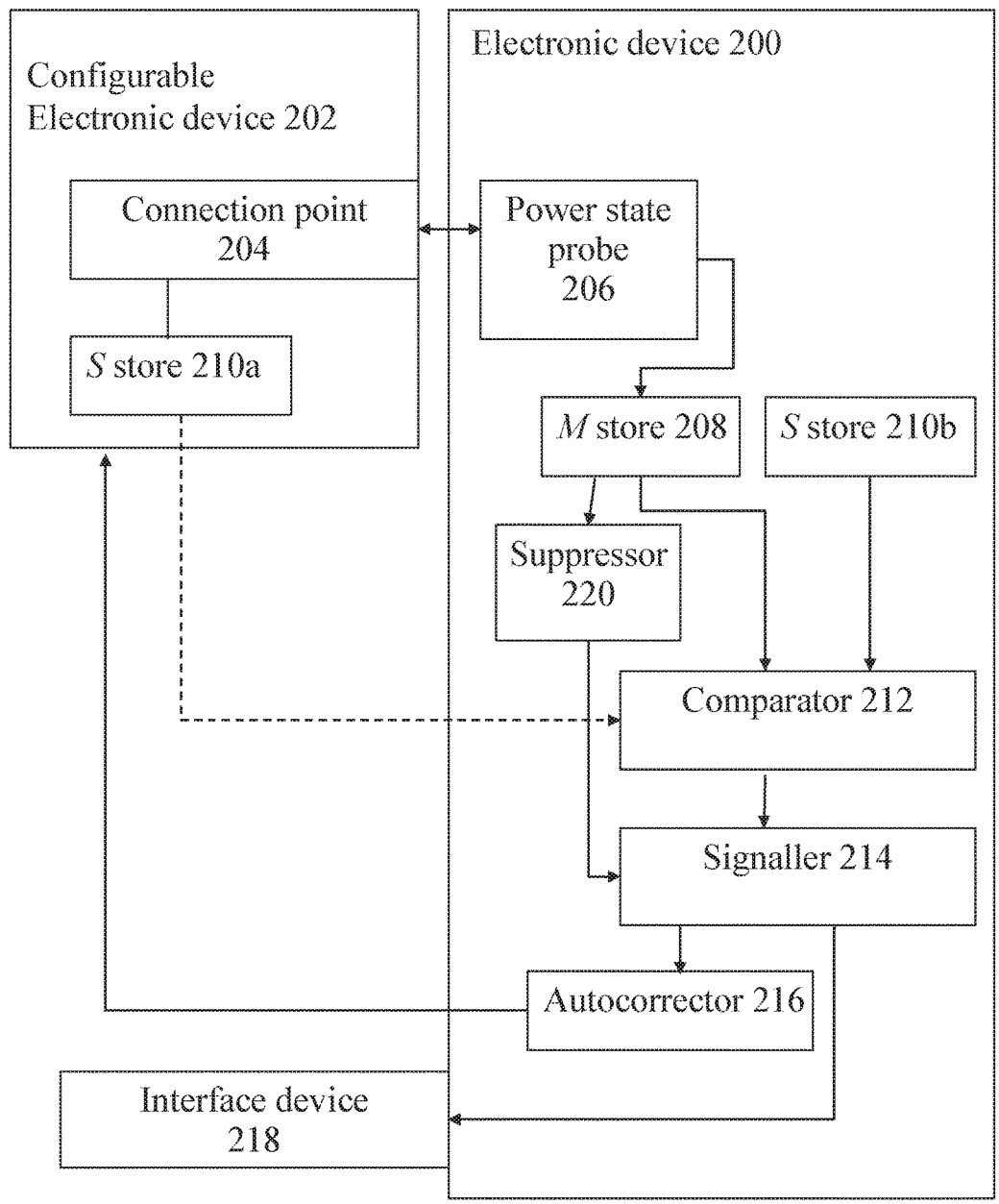
FIG. 2 shows an arrangement of apparatus operable to detect configuration settings that can cause undesired energy consumption in electronic devices.

In a second approach to the technology shown in FIG. 2, there may be provided an electronic device 200 in electronic communication with a configurable electronic device 202, and having a power state probe 206 operable to probe a connection point 204 of configurable electronic device 202 to test for a measured power state value M. Measured power state value M may be stored in M store 208, and further supplied to comparator 212.

Comparator 212 may also be supplied with values S from S store 210a or from S store 210b, which may be, respectively, the first stored power state value S stored in a configuration file or the like on the configurable electronic device and a second stored power state value S stored in a library. S store 210b, the second stored power state value S stored in a library, has been shown in the figure as incorporated in electronic device 200, but may equally be stored externally.

Comparator 212 is operatively coupled to signaler 214, which may emit condition signals on detecting discrepancies between any pairs comprising measured power state value M first stored power state value S and second stored power state value S. The condition signals emitted by signaler 214 may be received by autocorrector 216, if an autocorrect function is enabled. Autocorrector 216 may then perform one or more actions to correct the configuration of configurable electronic device 202, thereby alleviating the potential for causing undesired power consumption.

Whether or not an autocorrect function is enabled, signaler 214 may also be operable to emit a signal to interface device 218, thereby causing interface device 218 to emit a human-readable indication that a discrepancy with the potential for causing undesired power consumption has been found. Such a human-readable indication may include an audible indication (e.g. alarm, buzzer), a visual indication (e.g. text on a screen, light such as an LED etc.) and/or a physical indication (e.g. vibration).

In one variant, signaler 214 may be connected to suppressor 220, which may be responsive to data from M store 208 to recognize a value that has been marked for suppression, either by a human operator or by an automated process recognizing, for example, a second discrepancy at a particular connection point 204. Suppressor 220 may thus act to suppress further action by signaler 214, so that autocorrector 216 and interface device 218 need take no action for a suppressed discrepancy.

Figure 3:
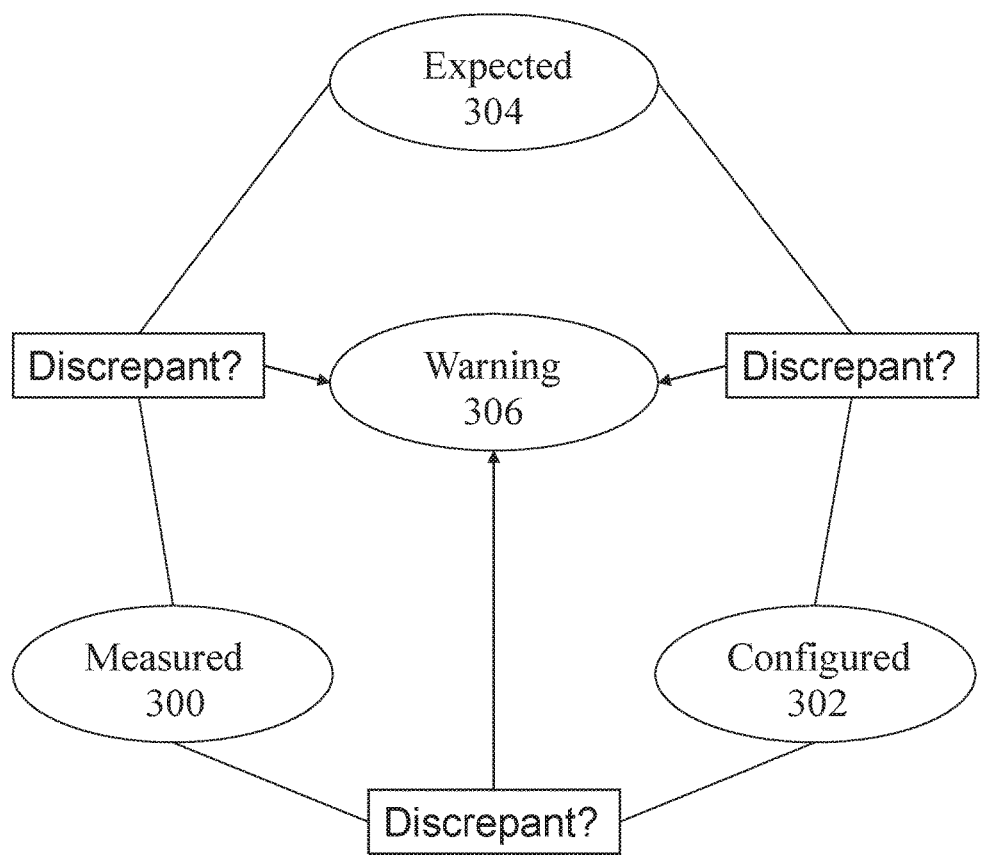
FIG. 3 shows a logic structure according to embodiments of the disclosed technology.

Turning to FIG. 3, there is shown a logic structure for detecting and responding to a setting capable of causing undesired energy consumption in a configurable electronic device. The logic structure shows a response to detection of a discrepancy between a measured power state value "Measured" 300 and a stored power state value for a connection point. In one embodiment, the stored power state value is the configuration power state data "Configured" 302, stored on the configurable electronic device. The logic structure also shows the response to a discrepancy between configuration power state data "Configured" 302, stored on the configurable electronic device, and expected power state data "Expected" 304 stored in a library, and to a discrepancy between the measured power state value "Measured" 300 and the expected power state data "Expected" 304 stored in a library. On detection of any discrepancy capable of causing undesired power consumption, the logic issues a condition signal "Warning" 306, which may cause emission of a human-readable warning, or may trigger automated corrective action.

In embodiments of the present technology, the step of comparing the measured power state value with a stored power state value for the connection point may comprise comparing with configuration power state data stored on the configurable electronic device. The step of comparing the measured power state value with a stored power state value for the connection point may comprise comparing with expected power state data stored in a library. The step of comparing the measured power state value with a stored power state value for the connection point may comprise comparing with expected power state data stored in a library.

The present technique may be embodied such that configuration power state data stored on the configurable electronic device may be compared with expected power state data stored in a library—responsive to a discrepancy between the configuration power state data stored on the configurable electronic device and the expected power state data stored in a library, a condition signal may be emitted.

In one variant, the condition signal may trigger one or more human-readable warning indicia. In addition or as an alternative, the condition signal may trigger an automated correction to configuration power state data stored on the configurable electronic device.

The present technique may be initiated, for example, by a reset action on the configurable electronic device, or by an action to start entry into a low power state on the configurable electronic device. The step of measuring a power state of at least one connection point of the configurable electronic device may comprise inducing at least one power state change at the connection point and sampling ensuing responsive state data. Further, the step of measuring a power state of at least one connection point of the configurable electronic device may comprise temporarily changing a characteristic of the at least one connection point and sampling ensuing responsive state data. The steps of the disclosed method may be performed by a further electronic device temporarily connected to the at least one connection point. In one variant of the present technique, there may be performed a further step of retaining data for a first discrepancy and suppressing the condition signal for a second discrepancy at the same connection point, and the data may be marked with a "no signal" mark.

As will be appreciated by one skilled in the art, the present techniques may be embodied as a system, method or computer program product. Accordingly, the present techniques may take the form of an entirely hardware embodiment, an entirely software embodiment, or an embodiment combining software and hardware.

Furthermore, the present techniques may take the form of a computer program product embodied in a computer readable medium having computer readable program code embodied thereon. The computer readable medium may be a computer readable signal medium or a computer readable storage medium. A computer readable medium may be, for example, but is not limited to, an electronic, magnetic, optical, electromagnetic, infrared, or semiconductor system, apparatus, or device, or any suitable combination of the foregoing.

Computer program code for carrying out operations of the present techniques may be written in any combination of one or more programming languages, including object oriented programming languages and conventional procedural programming languages.

For example, program code for carrying out operations of the present techniques may comprise source, object or executable code in a conventional programming language (interpreted or compiled) such as C, or assembly code, code for setting up or controlling an ASIC (Application Specific Integrated Circuit) or FPGA (Field Programmable Gate Array), or code for a hardware description language such as Verilog™ or VHDL (Very high speed integrated circuit Hardware Description Language).

The program code may execute entirely on the user's computer, partly on the user's computer and partly on a remote computer or entirely on the remote computer or server. In the latter scenario, the remote computer may be connected to the user's computer through any type of network. Code components may be embodied as procedures, methods or the like, and may comprise sub-components which may take the form of instructions or sequences of instructions at any of the levels of abstraction, from the direct machine instructions of a native instruction set to high-level compiled or interpreted language constructs.

It will also be clear to one of skill in the art that all or part of a logical method according to embodiments of the present techniques may suitably be embodied in a logic apparatus comprising logic elements to perform the steps of the method, and that such logic elements may comprise components such as logic gates in, for example a programmable logic array or application-specific integrated circuit. Such a logic arrangement may further be embodied in enabling elements for temporarily or permanently establishing logic structures in such an array or circuit using, for example, a virtual hardware descriptor language, which may be stored and transmitted using fixed or transmittable carrier media.

In one alternative, an embodiment of the present techniques may be realized in the form of a computer implemented method of deploying a service comprising steps of deploying computer program code operable to, when deployed into a computer infrastructure or network and executed thereon, cause said computer system or network to perform all the steps of the method.

In a further alternative, an embodiment of the present technique may be realized in the form of a data carrier having functional data thereon, said functional data comprising functional computer data structures to, when loaded into a computer system or network and operated upon thereby, enable said computer system to perform all the steps of the method.

It will be clear to one skilled in the art that many improvements and modifications can be made to the foregoing exemplary embodiments without departing from the scope of the present technique.

The invention claimed is:

1. A machine-implemented method for detecting and responding to a configuration setting capable of causing undesired energy consumption in a configurable electronic device, the method comprising:
    measuring a power state of at least one connection point of said configurable electronic device to establish a measured power state value;
    comparing said measured power state value with a stored power state value for said connection point, said stored power state value comprising expected power state data;
    responsive to a discrepancy between said measured power state value and said stored power state value for said connection point where said discrepancy is capable of causing undesired energy consumption, emitting a condition signal;
    retaining data for a first said discrepancy; and
    suppressing said condition signal for a second said discrepancy at the same connection point.

2. The machine-implemented method as claimed in claim 1, wherein comparing said measured power state value with a stored power state value for said connection point comprises comparing with configuration power state data stored on said configurable electronic device.

3. The machine-implemented method as claimed in claim 1, wherein comparing said measured power state value with a stored power state value for said connection point comprises comparing with the expected power state data stored in a library.

4. The machine-implemented method as claimed in claim 1, further comprising:
   comparing configuration power state data stored on said configurable electronic device with the expected power state data stored in a library; and
   responsive to a discrepancy between said configuration power state data stored on said configurable electronic device and said expected power state data stored in the library, emitting the condition signal.

5. The machine-implemented method as claimed in claim 1, wherein said condition signal triggers one or more human-readable warning indicia.

6. The machine-implemented method as claimed in claim 1, wherein said condition signal triggers an automated correction to configuration power state data stored on said configurable electronic device.

7. The machine-implemented method as claimed in claim 1, initiated by a reset action on said configurable electronic device.

8. The machine-implemented method as claimed in claim 1, initiated by an action to start entry into a low power state on said configurable electronic device.

9. The machine-implemented method as claimed in claim 1, wherein measuring a power state of at least one connection point of said configurable electronic device comprises inducing at least one power state change at said connection point and sampling ensuing responsive state data.

10. The machine-implemented method as claimed in claim 1, wherein measuring a power state of at least one connection point of said configurable electronic device comprises temporarily changing a characteristic of said at least one connection point and sampling ensuing responsive state data.

11. The machine-implemented method as claimed in claim 1, wherein all the steps of the method are performed by a further electronic device temporarily connected to said at least one connection point.

12. The machine-implemented method as claimed in claim 1 and further comprising: marking said data with a "no signal" mark.

13. An electronic device for detecting and responding to a configuration setting capable of causing undesired energy consumption in a configurable electronic device, and comprising:
   a power measurement component operable to measure a power state of at least one connection point of said configurable electronic device to establish a measured power state value;
   a comparator operable to compare said measured power state value with a stored power state value for said connection point, said stored power state value comprising expected power state data;
   a signaling component responsive to a discrepancy between said measured power state value and said stored power state value for said connection point where said discrepancy is capable of causing undesired energy consumption to emit a condition signal;
   storage to retain data for a first said discrepancy; and
   a suppressor to suppress said condition signal for a second said discrepancy at the same connection point.

14. A computer program product comprising computer program code tangibly stored on a non-transitory computer-readable medium and operable to cause a computer system to:
   measure a power state of at least one connection point of an electronic device to establish a measured power state value;
   compare said measured power state value with a stored power state value for said connection point, said stored power state value comprising expected power state data;
   responsive to a discrepancy between said measured power state value and said stored power state value for said connection point where said discrepancy is capable of causing undesired energy consumption, emit a condition signal;
   retain data for a first said discrepancy; and
   suppress said condition signal for a second said discrepancy at the same connection point.

* * * * *